No. 637,571. Patented Nov. 21, 1899.
E. HETT.
CONTROLLING ENGINE FOR PRESSES.
(Application filed Sept. 8, 1898.)

(No Model.) 7 Sheets—Sheet 1.

Fig. 1.

WITNESSES:
F. N. Roehrich
Edwin Seger

INVENTOR
Edward Hett
BY
Witter & Kenyon
ATTORNEYS

No. 637,571. Patented Nov. 21, 1899.
E. HETT.
CONTROLLING ENGINE FOR PRESSES.
(Application filed Sept. 8, 1898.)

(No Model.) 7 Sheets—Sheet 3.

WITNESSES: INVENTOR
Fr. N. Roehrich Edward Hett
Edwin Seger BY
Witter & Kenyon
ATTORNEYS No. 637,571. Patented Nov. 21, 1899.
E. HETT.
CONTROLLING ENGINE FOR PRESSES.
(Application filed Sept. 8, 1898.)

(No Model.) 7 Sheets—Sheet 5.

WITNESSES:
Fr. N. Roehrich
Edwin Leges

INVENTOR
Edward Hett

BY
Watter & Kenyon
ATTORNEYS

No. 637,571. Patented Nov. 21, 1899.
E. HETT.
CONTROLLING ENGINE FOR PRESSES.
(Application filed Sept. 8, 1898.)
(No Model.) 7 Sheets—Sheet 6.

WITNESSES:
Fr. N. Roehrich
Edwin Legar

INVENTOR
Edward Hett
by
Walter + Kenyon
ATTORNEYS

THE NORRIS PETERS CO., PHOTO-LITHO., WASHINGTON, D. C.

UNITED STATES PATENT OFFICE.

EDWARD HETT, OF NEW YORK, N. Y.

CONTROLLING-ENGINE FOR PRESSES.

SPECIFICATION forming part of Letters Patent No. 637,571, dated November 21, 1899.

Application filed September 8, 1898. Serial No. 690,479. (No model.)

*To all whom it may concern:*

Be it known that I, EDWARD HETT, a citizen of the United States, and a resident of New York, (New Dorp,) in the county of Richmond, State of New York, have invented certain new and useful Improvements in Controlling-Engines for Presses, of which the following is a specification.

My invention relates to presses, and more especially to devices for controlling the movements of parts of the mechanism in such presses—as, for example, for controlling the movements in a lithographic press of the printing-surfaces, the inking mechanisms, and the damping mechanism into and out of operative position.

It has for its object to provide means for controlling the movements of parts of presses, especially movements of parts of the press into and out of operative position, to effect such control more easily, efficiently, and with greater precision and certainty than has heretofore been possible, and preferably to do this automatically and without requiring a change in the direction of the motive power, and also to provide means by which the operator can readily put the automatic controlling mechanism into operation.

In the operation of the multicolor-press, in connection with which my improved devices are here shown and described, it is necessary to move the entire series of printing-surfaces out of or into contact with the impression-surface, to move the inking mechanisms out of or into contact with the printing-surfaces by swinging the ink-frames carrying the inking mechanisms, and to move the damping mechanisms out of or into contact with the printing-surfaces by swinging the damping-frames carrying the damping mechanisms, and it is in connection with these movements and to control them that my improved devices are herein shown and described.

In the preferred form of my improved controlling-engine shown and described herein I employ connecting mechanism or mechanisms between the driving mechanism of the controlling-engine, hereinafter referred to, and the part or parts of the press to be moved, connecting the said driving mechanism with the said part or parts of the press, driving mechanism, preferably driven by the driving mechanism of the press, for imparting motion through the said connecting mechanism or mechanisms to the said part or parts of the press to be moved, and suitable clutch mechanism, preferably electric, and in part automatically operated to connect and disconnect the driving mechanism of the controlling-engine with some suitable source of power, preferably the driving mechanism of the press, and to connect the said driving mechanism of the controlling-engine with the said connecting mechanism or mechanisms and to disconnect them. I prefer to use in my controlling-engine driving mechanism which is capable of motion in either direction, as I am thus enabled by the use of the same controlling mechanism to impart to the part or parts of the press to be moved a movement one way or the other, as desired. Such movement one way or the other I obtain by employing, preferably between the source of power and the driving mechanism of the controlling-engine, clutch mechanism which is capable of assuming any of three separate positions, in one of which the source of power is wholly disconnected from the driving mechanism of the controlling-engine, in which case the part or parts of the press to be moved remain at rest, and in the other two of which positions the driving mechanism of the controlling-engine is connected with the source of power in one of said positions to impart motion in one direction to the driving mechanism of the controlling-engine to move the part or parts of the press one way and in the other of said positions to impart motion in the opposite direction to the driving mechanism of the controlling-engine to move the said part or parts of the press the other way. My preferred form of mechanism for this purpose is shown in the drawings, and consists of two clutch gear-wheels intermediate between the source of power and the main shaft of my controlling-engine and a clutch automatically operated adapted to cause one or the other or neither of the clutch gear-wheels to connect the source of power with the said shaft, although of course any other mechanism suitable for the purpose may be employed.

I will now proceed to describe the particular form of controlling-engine shown in the drawings herein.

Figs. 2$^a$, 2$^b$, 2$^c$, and 2$^d$ are diagrams illustrating the electrical connections and their mode of operation.

1 is the shaft upon which the impression-drum 2 of the multicolor lithographic press (shown in part in Fig. 1) is located. This multicolor lithographic press is substantially the same as that shown and described in my said application Serial No. 593,796, and the mechanism of it will not be described in detail any further than is necessary to convey a clear idea of the connection between it and my improved controlling-engine and the control of the operation of certain parts of the said press by my said controlling-engine. The parts of the press which are moved into or out of operative position by means of my controlling-engine are the printing-cylinders 3 3, damping-frames 4 4, of which only one is shown in the drawings, and the inking-frames 5, of which only one is shown in the drawings. The mechanism by which my controlling-engine moves these into or out of operative position will be presently described.

Figure 1:
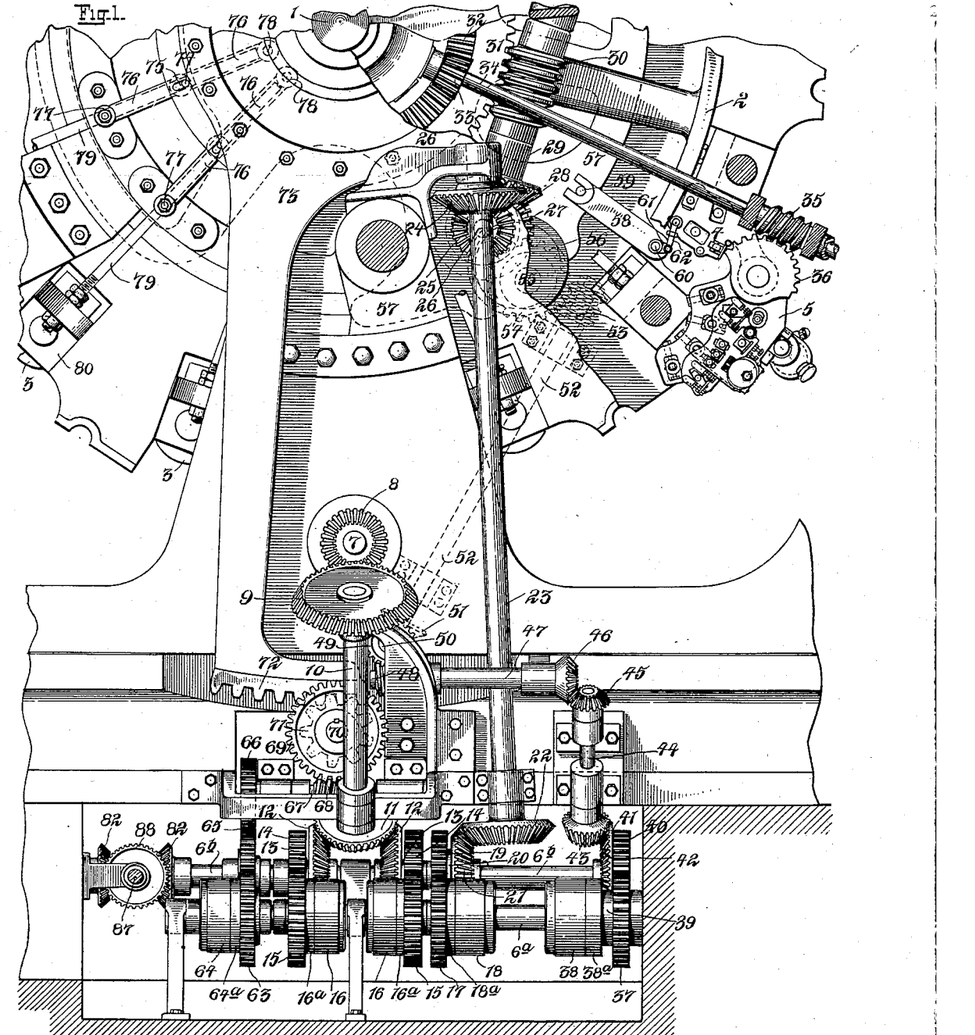
Figure 1 is a side view of such controlling-engine and of a part of a multicolor lithographic press with the casing and with certain parts broken away to show more fully the operation of the parts.
Figure 2:
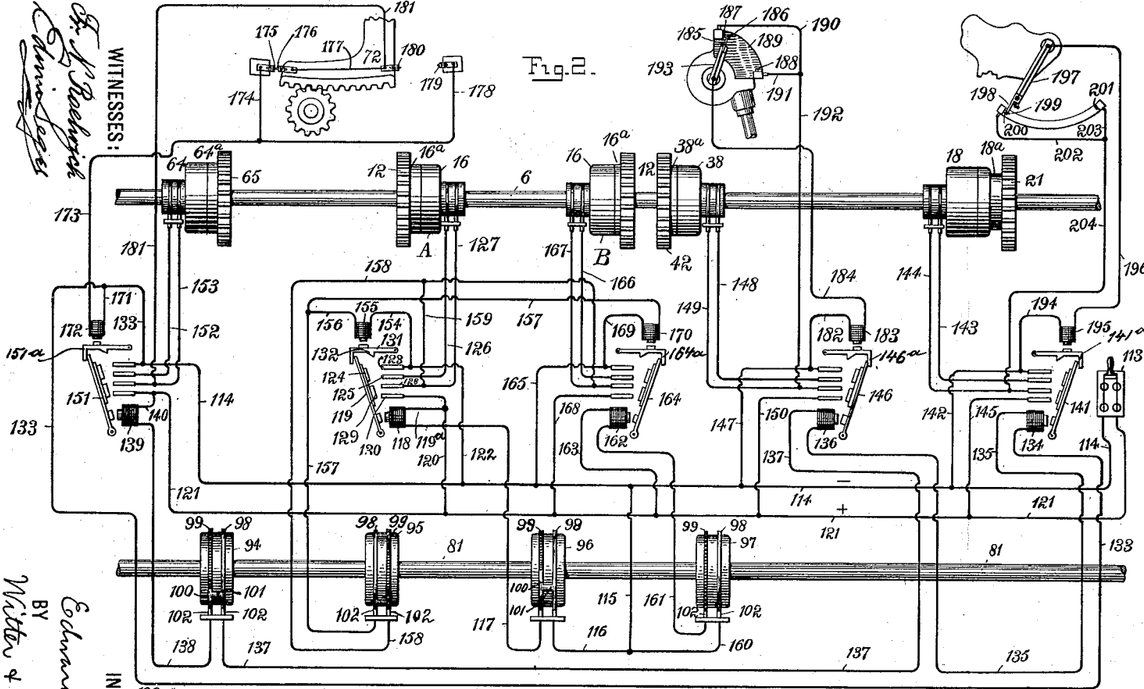
Fig. 2 is a diagrammatic plan showing the circuits preferably used by me in the operation of my controlling-engine.
Figures 2A, 2B, 2C, 2D:
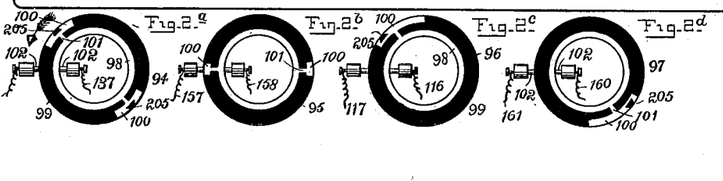

My controlling-engine proper has a shaft which is preferably adapted to rotate in either direction and is preferably driven by the driving mechanism of the press and is connected by connecting mechanisms presently to be described with the printing-cylinders, damping-frames, and inking-frames. This shaft is shown in Fig. 2 as a single shaft 6, but I prefer to use for this purpose two shafts 6$^a$ 6$^b$, as shown in Fig. 1. This shaft is provided with gear-wheels and with clutch mechanism, preferably electric. It is immaterial whether one or two shafts be used, as the effect is substantially the same in both cases. I prefer the double form shown in Fig. 1, for the reason that the gear-wheels can be placed upon one part of this compound shaft and the electric clutch mechanisms on the other part, thus enabling a shorter shaft to be used and the controlling-engine to be made more compact and smaller in size. The shaft of the controlling-engine is preferably driven by the driving mechanism of the press, although any suitable driving mechanism may be employed for that purpose. As shown in Fig. 1, the main driving-shaft 7 of the press carries at one end a beveled gear-wheel 8, which meshes with gear-wheel 9 upon shaft 10. Shaft 10 carries at its other end a beveled gear-wheel 11.

In order to impart motion to the shaft of the controling-engine in either direction, as desired, two clutch gear-wheels 12 12 are interposed between the shaft and beveled gear-wheel 11. Gear-wheels 12 12 are each loosely mounted on shaft 6$^b$, as shown in Fig. 1, and mesh with gear-wheel 11. As shown, gear-wheels 12 12 are each rigidly secured to a sleeve 13, which turns loosely on shaft 6$^b$, and also carries at its other end gear-wheel 14, the latter meshing with gear-wheel 15, loosely mounted on shaft 6$^a$. 16 16$^a$ are the two parts of an electric clutch for connecting each gear-wheel 15 with shaft 6$^a$, part 16$^a$ of the clutch being connected with shaft 6$^a$ so as to be capable of motion longitudinally along the shaft, but to rotate with the shaft. This may be accomplished by any well-known means—such, for instance, as by spline and feather. Part 16$^a$ of each clutch is integral with its gear-wheel 15 and is loose upon shaft 6$^a$. The form of this clutch mechanism may be of any suitable kind, and the details are accordingly not shown. Each of the electric clutch mechanisms is so arranged that when the current is passed through it the two parts of the clutch mechanism will lock together, thus causing shaft 6$^a$ to rotate in one direction or the other, depending upon which one of the electric clutch mechanisms 16 16$^a$ is energized. In this way the shaft 6$^a$ of the controlling-engine is driven one way or the other, as desired.

17 is a gear-wheel loosely mounted upon shaft 6$^a$.

18 18$^a$ are the two parts of an electric clutch mechanism for connecting gear-wheel 17 with shaft 6$^a$, part 18 rotating with shaft 6$^a$ and movable longitudinally thereon and part 18$^a$ being integral with gear-wheel 17. Gear-wheel 19, mounted upon sleeve 20 on shaft 6$^b$, meshes with gear-wheel 17. Sleeve 20 also carries beveled gear-wheel 21. When electric clutch mechanism 18 18$^a$ is energized, gear-wheel 21 rotates one way or the other, dependent on the direction of rotation of the shaft 6$^a$. Gear-wheel 21 is intermediate between the shaft of the controlling-engine and the connecting mechanism connecting the controlling-engine with the inking-frames. This connecting mechanism is as follows— namely, beveled gear-wheel 22 on shaft 23, beveled gear 24 on the other end of the shaft meshing with beveled gear 25 on shaft 26, the latter carrying at its other end gear-wheel 27, gear-wheel 28 on shaft 29 meshing with gear 27, worm 30 on said shaft meshing with worm-wheel 31, mounted on shaft 1 of the press and having teeth 32 on its face, beveled gear 33 on shaft 34 meshing with teeth 32, shaft 33, carrying at its other end worm 35, which meshes with worm-wheel 36, secured to inking-frame 5. Each inking-frame has a similar worm-wheel 36, shaft 34 with worm 35, and beveled gear-wheel 33, meshing with the same teeth 32 on the worm-wheel 31. Thus whenever clutch mechanism 18 18$^a$ is energized the shaft of the controlling-engine, through gear-wheel 21 and the above-described connecting mechanism, moves all of the inking-frames of the press simultaneously into or out of operative position, depending upon which one of the two electric clutch mechanisms 16 16$^a$ is energized. If one of the latter clutch mechanisms is energized, the inking-frames are moved so as to throw the inking-rollers into operative position, and if the other clutch mechanism 16 16$^a$ is energized the inking-frames are moved so as to move the inking-rollers out of operative position.

Shaft 26 carries two gear-wheels 25 27, one on each side of the outer frame of the press, the inner gear 27 meshing with a beveled gear 28 on the shaft 29, having a worm 30 meshing with a similar worm-wheel 31, having similar teeth 32. Each inking-frame at one side of the press is similarly provided with a worm-wheel 36, worm 35 on shaft 34, and beveled gear 33, meshing with teeth 32. The inking-frames at the other side of the press are connected with the inking-frames referred to above by any suitable means. Accordingly when electric clutch mechanism 18 18$^a$ is energized all the inking-frames on each side of the press are simultaneously swung so as to move the inking-rollers into or out of operative position, depending upon which one of the two electric clutch mechanisms 16 16$^a$ is energized.

The mechanism for moving the damping-frames, so as to move the damping-rollers into or out of operative position, consists of the following:

37 is a gear-wheel loosely mounted upon 6$^a$.

38 and 38$^a$ are the two parts of an electric clutch mechanism for operatively connecting gear-wheel 37 to shaft 6$^a$, 38 revolving with the shaft and having longitudinal motion thereon, as by spline and feather, and 38$^a$ being fixedly secured by sleeve 39 to gear-wheel 37.

40 is a gear-wheel mounted upon sleeve 41, the latter loosely mounted upon shaft 6$^b$ and also carrying beveled gear-wheel 42. When electric clutch mechanism 38 38$^a$ is energized, gear-wheel 42 is rotated one way or the other, depending upon the direction of rotation of shaft 6$^a$ in the manner above described. The connecting mechanism between gear-wheel 42 and the damping-frames of the press consists of the following-described mechanism: beveled gear-wheel 43 on shaft 44, beveled gear-wheel 45 on the other end of the shaft, beveled gear 46 on shaft 47, meshing with beveled gear 45, worm 48 upon shaft 47, meshing with worm-wheel 49 upon shaft 50. Shaft 50 runs across to the other side of the press and through the frame. It carries at its farther end a beveled gear-wheel, (not shown in the drawings,) the latter beveled gear-wheel meshing with beveled gear 51 on shaft 52, worm 53 at the farther end of shaft 52 meshing with worm-wheel 54 on shaft 55, eccentric 56, fixedly mounted on shaft 55 and working in a similarly-shaped opening in wheel 57, loosely mounted on shaft 1, arms 58, each with fingers encircling the pin 59, secured to wheel 57, and each pivoted at 60 and having arms 61 62, the latter being connected to damping-frame 4. On the nearer side of the machine there are also similar parts corresponding to beveled gear on shaft 50, referred to above and not shown, beveled gear 51, shaft 52, worm 53, gear-wheel 54, shaft 55, eccentric 56, wheel 57, arms 58, and the other connections described above between it and the damping-frames, so that each set of damping-frames is slightly rocked one way or the other whenever electric clutch mechanism 38 38$^a$ is energized. Each set of damping-frames has corresponding arms 58, pins 59, and crank-arms 61 62, so that all of the damping-frames of the press are simultaneously rocked backward or forward, so as to move the damping-rollers into or out of operative position, depending upon which one or the other of electric clutch mechanisms 16 16$^a$ is energized.

The mechanism for controlling the movement of the printing-cylinders into or out of operative position consists of the following:

63 is a gear-wheel loosely mounted upon shaft 6$^a$.

64 and 64$^a$ form electric clutch mechanism for operatively connecting gear-wheel 63 with shaft 6$^a$, 64 rotating with said shaft and being capable of longitudinal motion thereon, as above described, and 64$^a$ being integral with gear-wheel 63.

65 is a gear-wheel loosely mounted upon shaft 6$^b$. As electric clutch mechanism 64 64$^a$ is energized gear-wheel 65 is caused to rotate one way or the other with shaft 6$^a$, depending upon which one of the two electric clutch mechanisms 16 16$^a$ is energized. The connecting mechanism between gear-wheel 65 and the printing-cylinders consists of the following mechanism: gear-wheel 66 on shaft 67, the latter carrying at its other end worm 68, worm-wheel 69, meshing with worm 68 and mounted on shaft 70, the latter carrying two gear-wheels 71, one on each side of the press, one only of which is shown in the drawings, each gear-wheel 71 meshing with a toothed segment 72 of a wheel 73, loosely mounted upon shaft 1 of the press. Each wheel 73 on each side of the machine carries pins 74, working in a slot 75 on the two inner ends of the toggle-joint 76 76, the inner end of the toggle-joint toward the center of the press being free to move radially inward or outward from the center, the outward end of the toggle-joint being secured to the framework at 77. To the inner end 78 of each toggle-joint is secured a shaft 79, carrying at its outer end one of the bearing-boxes 80 of a printing-cylinder 3. A similar shaft, with its toggle-joint arrangement, carries the other bearing of the said printing-cylinder at the other side of the machine. There is a similar arrangement of toggle-joint and shaft connection between each bearing of each printing-cylinder of the press and each wheel 73, as above described. Accordingly as wheels 73 oscillate one way or the other when electric mechanism 64 64ª is energized and one or the other of electric clutch mechanisms 16 16ª is energized the printing-cylinders 3 3 are moved inward against the drum, so as to be in operative position for printing or are moved outward therefrom. By means of the two clutch gear-wheels 12 12 and their respective clutch mechanisms 16 16ª intermediate between the shaft of the controlling-engine and the driving mechanism of the press I am enabled to rotate the shaft of the controlling-engine in one direction or the other, as desired, by energizing one or the other of the said electric clutch mechanisms, and by means of each gear-wheel and its respective electric clutch mechanism intermediate between the shaft of the controlling-engine and the connecting mechanism connecting with a different part of the press to be moved, as above described, I am enabled to impart motion to the different parts of the press to be moved in one direction or the other, depending upon the direction of rotation of the said shaft of the controlling-engine, or I am enabled to stop the motion of any of said part or parts by deenergizing the proper electrical clutch mechanism.

The mechanism of my controlling-engine may be itself controlled by the operator in any suitable manner and by any suitable means. I prefer, however, to effect such control by means of electric circuits which are put into operation by circuit-controllers under the control of the operator, but whose operation thereafter is automatic. I have shown in Fig. 2 and will now proceed to describe my preferred system of electric circuits for this purpose.

In my preferred system I employ a series of circuits, preferably normally open, one for each electric clutch mechanism, and these circuits for purposes of clearness and conciseness I will designate as "clutch-circuits." When the clutch-circuit of any clutch mechanism is closed, the said clutch mechanism will be energized and when the circuit is broken the clutch mechanism will be deenergized. I also employ a series of circuits each containing an electromagnet for the purpose of making and breaking the clutch-circuits, and these circuits are denominated herein and will be referred to as "operating-circuits." Each clutch-circuit has its corresponding operating-circuit. Each operating-circuit is preferably normally open and has a circuit-controller which can be closed by the operator. Each operating-circuit is thus partially under the control of the operator, being closed by him. It is opened, however, automatically, as will be presently described. Preferably the operator closes the operating-circuit by closing the circuit-controller. This energizes an electromagnet in said circuit, and the latter in the usual manner attracts the circuit-controller of its corresponding clutch-circuit, thus closing that circuit. As the duration of the closing of the operating-circuits is but momentary, I employ a catch for seizing and holding the circuit-controller of the different clutch-circuits in their closed or operative position, thus keeping the clutch-circuits through the clutch mechanism closed until it becomes necessary to open them. They are automatically opened by the operation of my controlling-engine in the manner presently to be described. For the purpose of opening the clutch-circuits, I have arranged a series of circuits, which I will designate and refer to herein as "releasing-circuits," each containing an electromagnet adapted when operated to withdraw the catch, holding one of the circuit-controllers of the clutch-circuits closed, so as to release the said circuit-controller and permitting the clutch-circuit to open and deënergize the clutch mechanism. For the above purpose I preferably place a circuit-controller in each releasing-circuit, which is adapted to be closed automatically by the operation of the controlling-engine or a part of the press to close the releasing-circuit and to energize an electromagnet therein to withdraw the catch of the clutch-circuit for the above purpose, as will be presently described.

In Fig. 2 I have shown a diagrammatic plan of the various circuits referred to above and their connections. In this figure I have shown the shaft 6 of the controlling-engine as being composed of but one part and as carrying gear-wheels 12, 21, 42, and 65, (here shown as spur gear-wheels,) connecting with the various trains of gearing comprising the connecting mechanisms connecting with the different parts of the press to be moved and as also carrying clutch mechanisms 16 16ª, 18 18ª, 38 38ª, and 64 64ª as arranged upon one shaft 6. This construction, as above stated, is, however, in all substantial respects the same as that shown in Fig. 1, where the shaft of the controlling-engine consists of two separate shafts 6ª 6ᵇ. In Fig. 2 I have not shown the driving mechanism of the press nor have I shown the connecting mechanisms connecting the different gear-wheels with the different parts of the press to be moved.

In the operation of my improved controlling-engine, as shown in the drawings, the operator turns a hand-wheel to a certain predetermined point, thereby operating a circuit-controller to close the operating-circuit, which controls and thereby closes a circuit-controller in the clutch-circuit of one of the clutch mechanisms 16 16ª, thus causing the shaft of the controlling-engine to be driven by the driving mechanism of the press in one direction. By the same movement of the hand-wheel the operator also operates another circuit-controller, which closes an operating-circuit, and thereby closes circuit-controllers in each of the clutch-circuits through clutch mechanisms 18 18ª 38 38ª 64 64ª, thus operatively connecting gear-wheels 21, 42, and 65 with the shaft of the controlling-engine, and thereby imparting motion through the various connecting mechanisms to the damping-frames, inking-frames, and printing-cylinders of the press, causing them to move into their operative or printing positions. The circuit-controllers of the operating-circuits, thus closed by the operator by turning his hand-wheel, together with other circuit-controllers for the releasing-circuits, presently to be described, are preferably placed upon another shaft 81, which is driven by the main shaft of the controlling-engine. For purposes of clearness and brevity I will hereinafter speak of this shaft as a "circuit-controller" shaft. After the controlling-engine has thus been started by the operator the circuit-controller shaft continues to rotate until it automatically closes a releasing-circuit, which opens the circuit-controller of the clutch-circuit through the clutch mechanism 16 16ª, which has heretofore been energized, as above described, thus disconnecting the shaft of the controlling-engine from the driving mechanism. The controlling-engine therefore at once comes to rest, causing the printing-cylinders, damping-frames, and inking-frames also to stop immediately. This action is timed so as to occur exactly at the time that the printing-cylinders, damping-rollers, and inking-rollers are in their operative position ready for printing. To insure the stoppage of each of these different parts at the proper time, I also, preferably, provide means for disconnecting the respective gear-wheels 21, 42, and 65 from the shaft of the controlling-engine, which means are automatically actuated by the damping-frames, inking-frames, and printing-cylinders when they respectively reach the limits of their movements, in a manner presently to be described. The press is now in readiness for printing.

When the operator desires to discontinue the printing operation, he moves the hand-wheel again to another predetermined point, which operates certain circuit-controllers to close operating-circuits and in the manner above described to close the clutch-circuits through the other clutch mechanism 16 16ª and through clutch mechanisms 18 18ª, 38 38ª, and 64 64ª. This causes the shaft of the controlling-engine to rotate in the opposite direction and through the various connecting mechanisms to move the printing-cylinders, damping-frames, and inking-frames in the opposite direction, moving them out of operative or printing position. The circuit-controller shaft, however, continues to rotate, being driven in the manner presently to be described by the main shaft of the controlling-engine until it automatically operates the circuit-controller in another releasing-circuit, which opens the circuit-controller in the clutch-circuit through the clutch mechanism 16 16ª, last referred to, thus causing the shaft of the controlling-engine to stop, and thereby stopping the movements of the printing-cylinders, damping-frames, and inking-frames. To insure the stoppage of each of these parts at the proper point, I also provide means automatically actuated by each of these parts at the limit of its movement for disconnecting the gear-wheels 21, 42, and 65 from the shaft of the controlling-engine.

Figure 6:
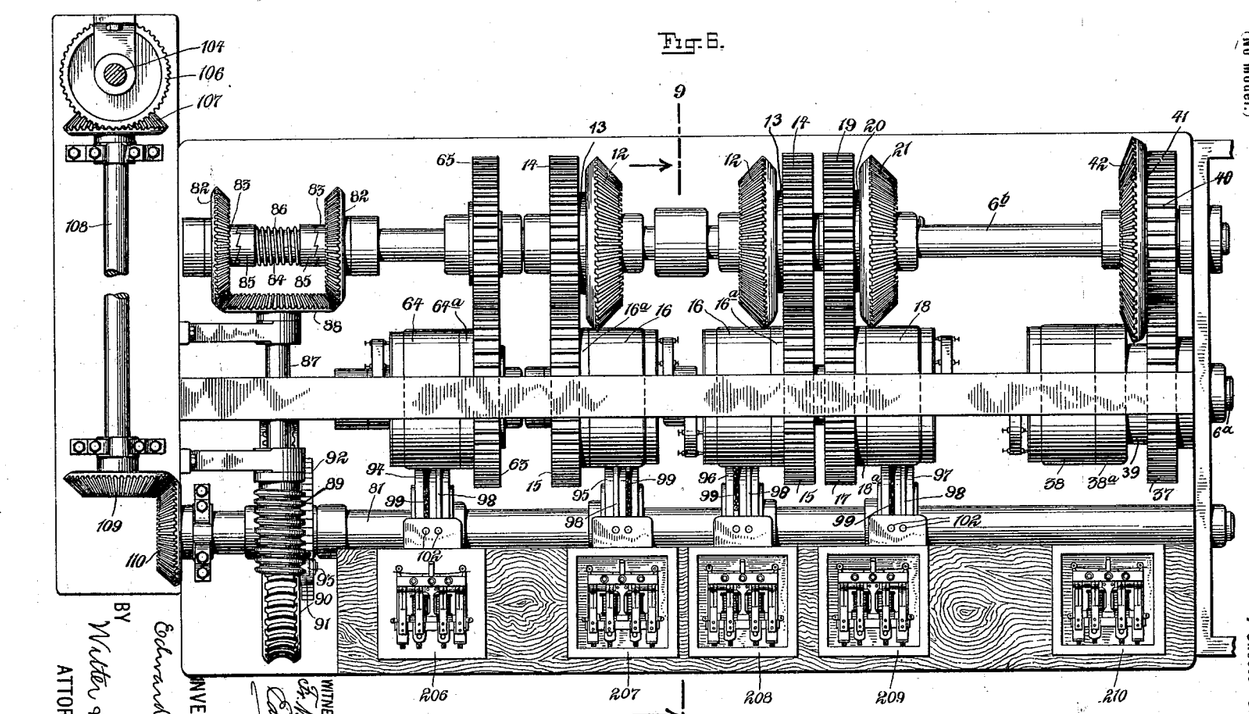
Fig. 6 is a plan view of my improved controlling-engine with the driving mechanism for driving it omitted and with the circuits also omitted.
Figure 7:
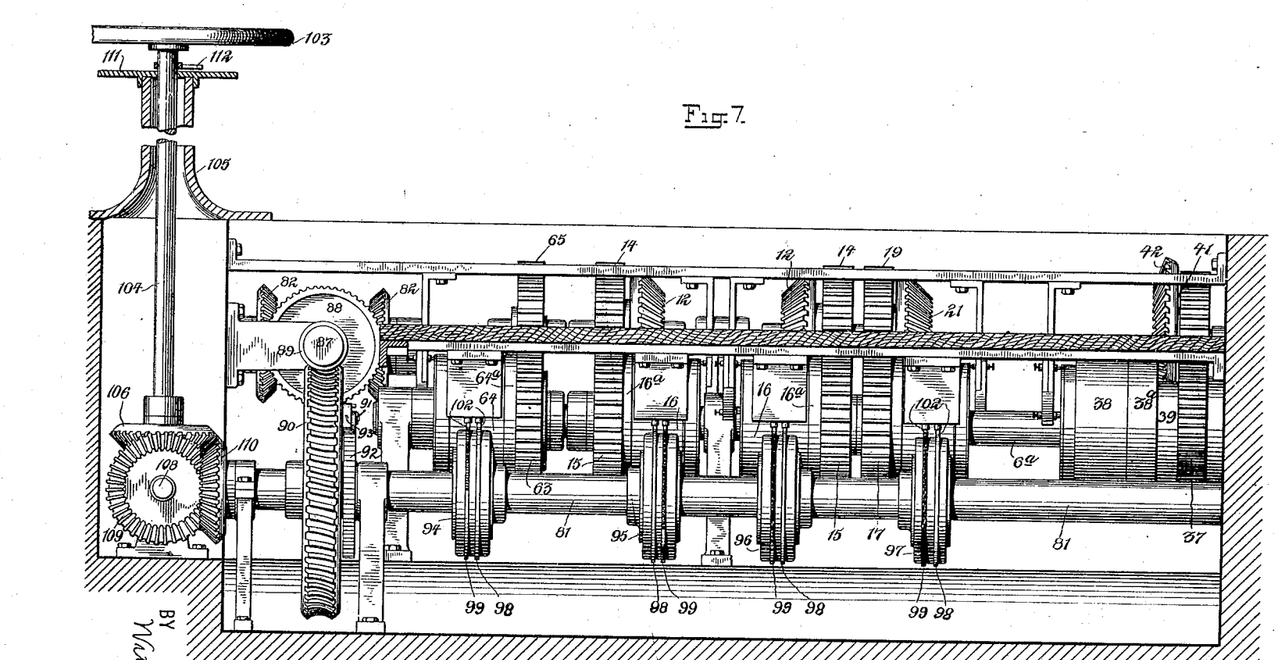
Fig. 7 is a front view, and Fig. 8 a side view, of the same.
Figure 8:
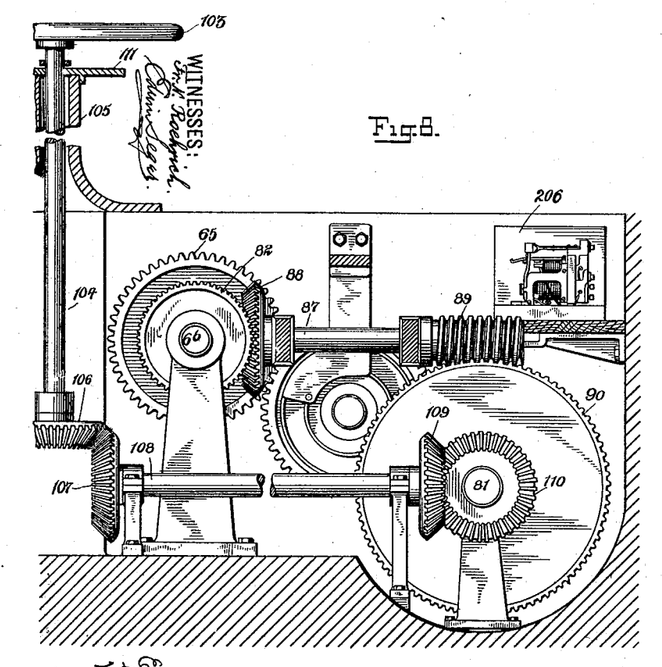
Figure 9:
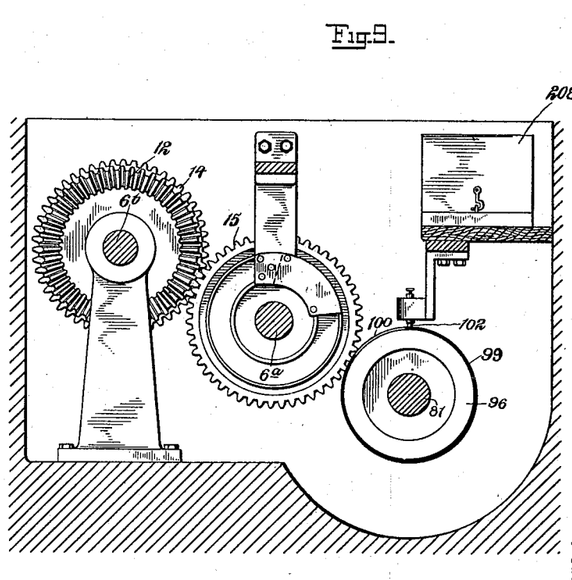
Fig. 9 is a vertical cross-section on the lines 9 9 of Fig. 6 viewed as shown by the arrow.
Figure 10:
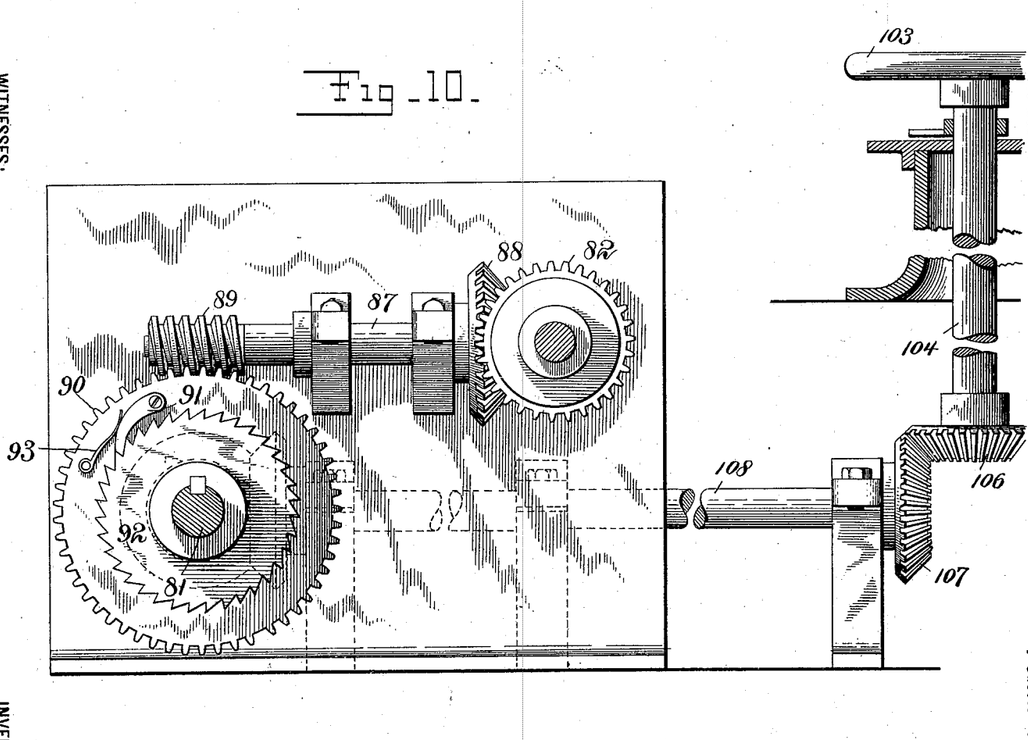
Fig. 10 is a detail showing pawl 91 and wheel 92 and their connections.

The mechanism and circuits for accomplishing the above results I will now proceed to describe. The circuit-controller shaft referred to above is omitted from Fig. 1, but is shown in Figs. 2, 6, and 7, and is represented by 81. This shaft is driven by the main shaft of the controlling-engine by means of the following mechanism: Sleeve 20, with gear-wheel 19 and beveled gear 21, is fast upon shaft 6ᵇ, so that when electric clutch mechanism 18 18ª is energized shaft 6ᵇ rotates with shaft 6ª. This rotation of 6ᵇ is sometimes in one direction and sometimes in another, dependent upon which one of the two clutch mechanisms 16 16ª is energized. Shaft 81 is driven from shaft 6ᵇ, but as it is important that shaft 81 shall always rotate in the same direction I communicate motion from shaft 6ᵇ to shaft 81 by the following-described mechanism, which changes the varying motion of shaft 6ᵇ into a rotation of shaft 81 in one direction only, and which also permits shaft 81 to be rotated independently of shaft 6ᵇ, for a purpose presently to be described. Loosely mounted upon shaft 6ᵇ are two beveled gear-wheels 82 82, facing each other, and each having a collar 83, provided with ratchet-teeth, the teeth of the collar of one gear-wheel pointing in an opposite direction to those of the collar of the other gear-wheel. Upon shaft 6ᵇ, between the gear-wheels, are two collars 85 85, each provided with ratchet-teeth facing the ratchet-teeth of collar 83 of one of the gear-wheels. The collars 85 are splined upon shaft 6ᵇ and are connected to it by any suitable means, as by spline and feather, so as to rotate with it and to be free to slide longitudinally a short distance thereon. These collars 85 are held toward the ends of the sleeve by coiled spring 86. As shaft 6ᵇ rotates in one direction the teeth of one of the collars 85 engage with the ratchet-teeth of one of the collars of the gear-wheels and rotate that wheel, while the teeth of the other collar 85 slip over the teeth of the collar of the other gear-wheel. As the shaft rotates in the other direction the latter gear-wheel is rotated, while the former remains loose upon the shaft. 87 is a shaft, which will hereinafter be spoken of as the "connecting-shaft," having at one end a beveled gear-wheel 88, meshing with gear-wheels 82 82, and at its other end a worm 89, meshing with worm-wheel 90, loosely mounted upon shaft 81. Worm-wheel 90 carries a pawl 91, which engages with ratchet-wheel 92 upon shaft 81. Pawl 91 is held in engagement with ratchet-wheel 92 by spring 93. Whichever one of gear-wheels 82 is clutched and driven by shaft 6$^b$, connecting shaft 87, is driven always in the same direction, and through worm 89, worm-wheel 90, pawl 91, and ratchet-wheel 92 it drives shaft 81 always in the same direction. This arrangement also permits circuit-controller shaft 81 to be turned independently of shaft 6$^b$ in a manner presently to be described. The circuit-controllers referred to above, which control the operating-circuits and part of the releasing-circuits, are mounted upon shaft 81. They consist of the wheels 94, 95, 96, and 97, all mounted upon and rotating with shaft 81. Each of these circuit-controller wheels has two rings, one, 98, composed of metal or other suitable conducting material throughout its entire circumference, the other, 99, consisting chiefly of insulating material, provided on its surface at one or more points with metallic or conducting portions 100. A metallic or conducting bridge 101 connects metallic portion 100 with ring 98. Contact-points 102 102, connected with wires, press against the two rings 98 and 99. When one of these contact-points 102 presses against metallic part 100 of ring 99, a circuit is closed through contact-points 102, ring 98, bridge 101, and metallic part 100 of ring 99; but when one of the contact-points 102 presses against the non-conducting parts of ring 99 the circuit is broken. In Figs. 2$^a$, 2$^b$, 2$^c$, and 2$^d$ I have shown the wheels 94, 95, 96, and 97 in the form of a diagram the more clearly to show the electrical connection of the parts, ring 98 being represented by the light inner ring and ring 99 by the outer dark ring, the non-conducting portions of the latter ring being represented in black and the conducting portions 100 of the said ring 99 and bridge 101 being represented as white. The size and arrangement of the metallic conducting portions 100 vary somewhat among different rings 99, as shown in Figs. 2$^a$, 2$^b$, 2$^c$, and 2$^d$, for a purpose presently to be described.

The various circuits employed by me and the means for operating them will now be described in the order in which they are brought into play in the operation of the machine.

Figure 3:
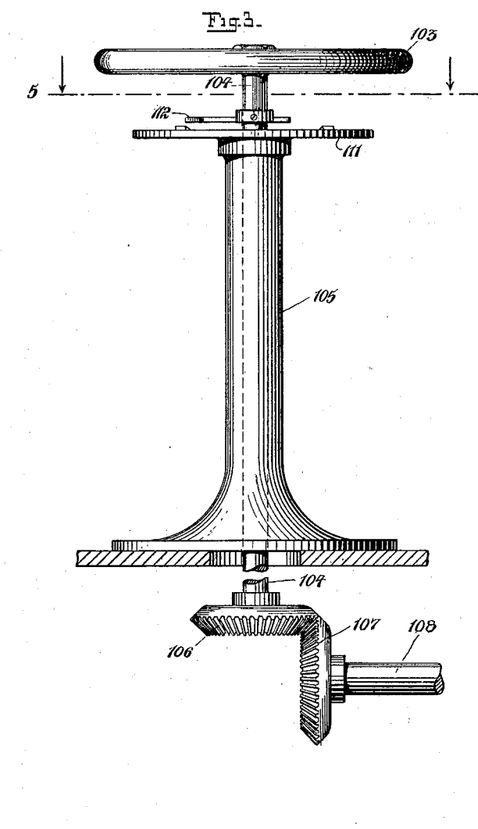
Fig. 3 is a side view of a hand-wheel and connections and the standard upon which it is mounted for operating the circuit-controllers hereinafter described.
Figures 4, 5:
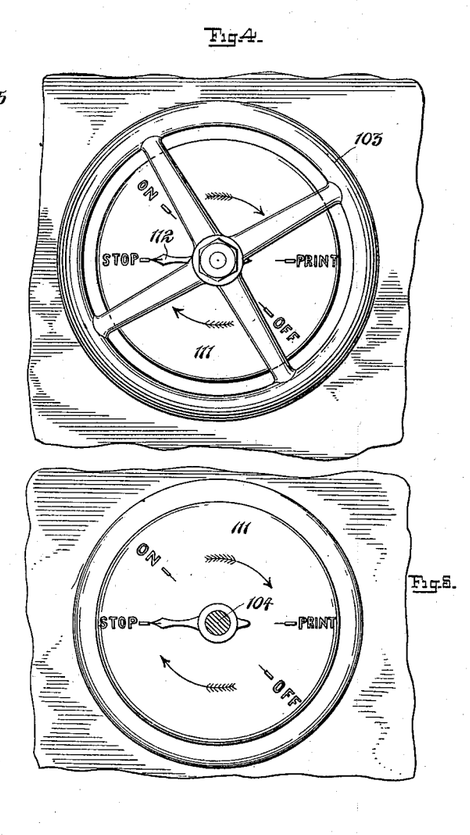
Fig. 4 is a plan view of the same.
Fig. 5 is a horizontal section of the same on the lines 5 5 of Fig. 3 viewed as shown by the arrow.

The operator starts the operation of the machine by means of a hand-wheel 103. (Most clearly shown in Figs. 3, 4, and 5.) This hand-wheel is mounted on a shaft 104, turning loosely in standard 105 and carrying at its lower end a beveled gear-wheel 106. The latter meshes with beveled gear-wheel 107 on shaft 108, the latter also carrying beveled gear-wheel 109 at its other end. Gear-wheel 109 meshes with beveled gear-wheel 110 on circuit-controller shaft 81. Thus by turning the hand-wheel shaft 81 can be rotated. Standard 105 carries at its upper end a plate 111, which bears upon its upper face certain stops which are marked, as shown in Fig. 4, as follows: "Stop," "On," "Print," and "Off." Fastened to shaft 104 immediately over plate 111 is an indicator-finger 112. When the machine is at rest, the indicator-finger rests opposite to the word "Stop." (Shown in Fig. 4.) When the operator desires to put the press into operation, he turns the hand-wheel in the direction indicated by the arrows in Figs. 4 and 5 until indicator 112 reaches the point marked "On." This turns shaft 81 and with it wheels 94, 95, 96, and 97 in the direction indicated by the arrow in Fig. 2$^a$ until the conducting portions 100 of wheels 96 and 94 are under one of the contact-points 102. This closes an operating-circuit, which controls and closes the clutch-circuit through the clutch mechanism 16 16$^a$ to the left, as shown in Fig. 2, which, for the purpose of identification, I have in that figure also marked with the letter A to distinguish it from the other clutch mechanism 16 16$^a$ to the right, which I have in said figure designated by the letter B, thus connecting the main shaft of the controlling-engine with the driving mechanism of the press and rotating that shaft in one direction. It also closes an operating-circuit, which closes the circuit-controllers in the three clutch-circuits through clutch mechanisms 18 18$^a$, 38 38$^a$, and 64 64$^a$, thus connecting the shaft of the controlling-engine with gear-wheels 21, 42, and 65 and moving the inking-frames, damping-frames, and inking-cylinders of the press. These circuits are as follows: The operating-circuit closed by circuit-controller 96 consists of negative pole, switch 113, main-line wire 114, wire 115 116, contact-points, rings, and bridge of wheel 96, wire 117, electromagnet 118, wire 119$^a$ 120, main-line wire 121, to positive source of electrical supply. This energizes magnet 118 and closes circuit-controller 119 of the clutch-circuit through clutch mechanism 16 16$^a$, (A.) This latter clutch-circuit consists of negative pole, main-line wire 114, wire 122, contact-point 123, bridge 124 of circuit-controller 119, contact-point 125, wire 126, electric clutch mechanism 16 16$^a$, (A,) wire 127, contact-point 128, bridge 129 on circuit-controller 119, contact-point 130, wire 120, main-line wire 121 to positive pole. The closing of this circuit energizes electric clutch mechanism 16 16$^a$ (A) and operatively connects the shaft of the controlling-engine with the driving mechanism of the press and rotates that shaft in one direction. As the conducting-surface 100 of circuit-controller wheel 96 is short, the closing of the circuit through magnet 118 is but momentary. In order, therefore, to prevent the circuit through electric clutch mechanism 16 16$^a$ (A) from being broken too soon, I employ a catch 131, which is spring-pressed, the spring not being shown, however, adapted to seize and hold circuit-controller 119 when attracted by magnet 118. For this purpose I provide a toe 132 on catch 131, which falls behind and locks circuit-controller 119 in its closed position until released, as hereinafter described. When the conducting portion 100 of circuit-controller wheel 94 comes into contact with contact-point 102, it closes the following operating-circuit: main-line wire 114, wire 133, magnet 134, wire 135, magnet 136, wire 137, contact-points, rings, and bridge of circuit-controller wheel 94, wire 138, magnet 139, wire 140, and main-line wire 121. This operating-circuit energizes magnets 134, 136, and 139. Magnet 134, in the same manner as above described with reference to magnet 118, closes circuit-controller 141, which closes the clutch-circuit through electric clutch mechanism 18 18$^a$. This circuit is as follows: main-line wire 114, wire 142, contact-points and bridge of circuit-controller 141, wire 143, electric clutch mechanism 18 18$^a$, wire 144, the other contact-points and bridge of circuit-controller 141, wire 145, and main-line wire 121. Electromagnet 136 similarly closes circuit-controller 146, closing the clutch-circuit through electric clutch mechanism 38 38$^a$. This clutch-circuit consists of main-line wire 114, wire 147, contact-points and bridge of circuit-controller 146, wire 148, electric clutch mechanism 38 38$^a$, wire 149, the other contact-points and bridge of circuit-controller 146, wire 150, to main-line wire 121. Electromagnet 139 similarly closes circuit-controller 151, which closes a clutch-circuit through clutch mechanism 64 64$^a$. This clutch-circuit consists of main-line wire 114, contact-points and bridge of circuit-controller 151, wire 152, clutch mechanism 64 64$^a$, wire 153, the other contact-points and bridge of circuit-controller 151, and main-line wire 121. By moving the hand-wheel until the indicator reaches the point marked "On" the operator has thus connected the main shaft of the controlling-engine with the driving mechanism of the press, thus rotating that shaft in one direction, and has also by the same operation energized electric clutch mechanisms 18 18$^a$, 38 38$^a$, and 64 64$^a$, connecting the shaft of the controlling-engine with gear-wheels 21, 42, and 65, and through the various connecting mechanisms imparting motion to the inking-frames, damping-frames, and inking-cylinders of the press. At the same time the rotation of the shaft of the controlling-engine, through connecting-shaft 87, as above described, imparts rotation to shaft 81. The latter shaft, therefore, continues to rotate, and as it does so, through the gearing connecting hand-wheel 103 with shaft 81, the hand-wheel is also rotated. This operation is automatic. By the time the indicator-finger 112 has arrived opposite the point on the plate 111 marked "Print" circuit-controller wheel 95 has rotated half-way until one of the conducting portions 100 of its ring 99 makes contact with contact-point 102. This automatically closes a releasing-circuit, which withdraws catch 131 from circuit-controller 119 and breaks the circuit through electric clutch mechanism 16 16$^a$, (A,) disconnecting the shaft of the controlling-engine from the driving mechanism and causing that shaft to immediately stop, thus stopping the movement of the different parts of the press. The said releasing-circuit is as follows: main-line wire 114, wire 122, wire 154, magnet 155, wire 156, wire 157, contact-points, bridge, and conducting portion of circuit-controller wheel 95, wire 158, wire 159, end of wire 127, contact-points and bridge of circuit-controller 119, wire 120, and main-line wire 121. Thus as magnet 155 is energized it attracts its armature-lever, catch 131, withdraws the catch from circuit-controller 119, and permits that circuit-controller to open and break the circuit through electric clutch mechanism 16 16$^a$, (A.) The operation of the controlling-engine has thus been automatically stopped by the controlling-engine itself. In order to insure that each of the different parts of the press that are being moved—to wit, the printing-cylinders, damping-frames, and inking-frames—shall stop at exactly the right spot, I also preferably provide means by which each of those parts automatically deënergizes electric clutch mechanisms 64 64$^a$, 38 38$^a$, and 18 18$^a$, thus insuring the stoppage of these different parts of the press at a predetermined point, preventing breakage of the parts, and insuring certainty and precision of movement. The mechanism for this purpose will be presently described. The parts of the press—namely, the printing-cylinders, damping-frames, and inking-frames—are now in their operative position ready for printing and the printing proceeds in the usual manner.

When the operator desires to discontinue the printing, he moves hand-wheel 103 so that the indicator-point moves from the point marked "Print," where it had stopped, until it reaches the point marked "Off." This movement of the hand-wheel moves circuit-controller shaft 81 until the conducting portion 100 of circuit-controller wheel 97 comes under one of the contact-points 102. In the manner above described this closes an operating-circuit, which closes a clutch-circuit through the other clutch mechanism 16 16$^a$ (B) and operatively connects the main shaft of the controlling-engine with the driving mechanism of the press in such a way that the shaft rotates in the opposite direction from that of its former rotation, and at the same time the other conducting-surface 100 on circuit-controller wheel 94 also comes into contact with one of the contact-points 102, closing the operating-circuit above described through magnets 134, 136, and 139, closing circuit-controllers 141, 146, and 151 of the clutch-circuits through clutch mechanisms 18 18$^a$, 38 38$^a$, and 64 64$^a$ in the manner above described, thus connecting the shaft of the controlling-engine with gear-wheels 21, 42, and 65 and moving the said different parts of the press—to wit, printing-cylinders, inking-frames, and damping-frames—in the opposite direction to their former movement—to wit, in a direction to place those parts out of operative printing position. The operating-circuit, which is closed by circuit-controller wheel 97, consists of main-line wire 114, wire 115, wire 160, contact-points, bridge, and conducting portion of circuit-controller wheel 97, wire 161, electromagnet 162, wire 163, to main-line wire 121. This energizes magnet 162 and closes circuit-controller 164 of the clutch-circuit through clutch mechanism 16 16ª, (B.) This clutch-circuit consists of main-line wire 114, wire 165, contact-points and bridge of circuit-controller 164, wire 166, clutch mechanism 16 16ª, (B,) wire 167, the other contact-points and bridge of circuit-controller 164, wire 168, to main-line wire 121. The controlling-engine is now in operation and is engaged moving the printing-cylinders, damping-frames, and inking-frames out of operative position. Shaft 81 is in the manner above described being rotated in the same direction as formerly by the main shaft of the controlling-engine, and hand-wheel 103 is also similarly rotated in the direction of the arrows shown in Figs. 4 and 5. When the indicator 113 of that wheel reaches the point marked "Stop," the other conducting-surface 100 on circuit-controller wheel 95 has completed its circuit and again arrived under one of the contact-points 102. This closes a releasing-circuit, which withdraws the catch of circuit-controller 164 and breaks the clutch-circuit through clutch mechanism 16 16ª, (B,) thus stopping the operation of the controlling-engine. This circuit is as follows: main-line wire 114, wire 165, wire 169, electromagnet 170, wire 157, contact-points, bridge, and conducting portion of circuit-controller wheel 95, wire 158, end of wire 167, contact-points and bridge of circuit-controller 164, wire 168, to main-line wire 121.

In order to withdraw catches 151ª, 146ª, and 141ª to permit circuit-controllers 151, 146, and 141 of the clutch-circuits through clutch mechanisms 64 64ª, 38 38ª, and 18 18ª to open and break the circuits through said clutch mechanisms, and also for the purpose of insuring the stoppage of the printing-cylinders, damping-frames, and inking-frames at the proper points, either when moving into operative position for printing or out of operative position, I preferably provide means automatically operated by the said parts of the press, respectively, when they have reached the limits of their respective movements, or just before they reach such limits, for withdrawing said catches, opening said circuit-controllers, and breaking the said clutch-circuits, thereby disconnecting gear-wheels 65, 21, and 42 and their respective connecting mechanisms from the shaft of the controlling-engine, and thus shutting off the power for moving the said different parts of the press. The said releasing-circuits are illustrated in the diagram of Fig. 2. Referring to Fig. 2, the circuit which withdraws catch 151ª, opens circuit-controller 151, and deënergizes electric clutch mechanism 64 64ª consists of the following parts, to wit: negative pole, switch 113, main-line wire 114, wire 133, wire 171, electromagnet 172, wire 173, either wire 174, contact-points 175 176, wire 177 or wire 178, contact-points 179 180, and wire 181, end of wire 153, contact-points and bridge of circuit-controller 151, and main-line wire 121. Contact-points 176 180, wire 177, and end of wire 181 are carried upon segment 72 of one of the wheels 73, which move printing-cylinders into or out of operative position. As the standard 72 and wheels 73 reciprocate contact-points 175 176 make contact at the limit of their movement in one direction, thus closing the said releasing-circuit through electromagnet 172, withdrawing the catch, breaking the clutch-circuit, and stopping the printing-cylinders in their movement. As standard 72 and wheels 73 move the other way contact-points 179 and 180 make contact at the limit of the movement in that other direction, similarly closing the circuit through electromagnet 172 and stopping the printing-cylinders. The releasing-circuit, which is automatically closed by the damping-frames, when they reach the limits of their movements, either into or out of operative position, consists of the following: main-line wire 114, wire 147, wire 182, electromagnet 183, wire 184, spring-arm 185, having contact-pin 186 projecting through the outer end of the spring-arm on both sides of the arm, contact-points 187 188, mounted on insulation-disk 189, wires 190 191, uniting into wire 192, end of wire 149, contact-points and bridge of circuit-controller 146, wire 150, and main-line wire 121. The end of wire 184 and the spring-arm 185 are carried on oscillating arm 193. This arm is carried on the same shaft 55 upon which is mounted eccentric 56, which oscillates wheel 57, which wheel imparts a reciprocating movement to the various damping-frames of the press, as above described. Whenever the damping-frames reach one limit or the other of their movements, contact-points 186 and 187 or 186 and 188 make contact and close the releasing-circuit through electromagnet 183, thus withdrawing catch 146ª, permitting circuit-controller 146 to open, thus breaking the clutch-circuit through clutch mechanism 38 38ª, and stopping the damping-frames. A similar releasing-circuit is automatically operated by the inking-frames at the limits of their movements into or out of operative position. This circuit consists of main-line wire 114, wire 142, wire 194, electromagnet 195, wire 196, swinging arm 197, carrying the end of wire 196, spring contact-point 198 upon the end of arm 197, electrically connected with the end of wire 196, contact-point 199, projecting on both sides of the end of spring 198, contact-points 200 201, wires 202 203, uniting into wire 204, end of wire 144, contact-points and bridge of circuit-controller 141, wire 145, and main-line wire 121. Arm 197 and its connections may be placed upon any one of the different sets of inking-frames of the press, so as to oscillate with the said set of inking-frames. As the inking-frames move one way or the other arm 197 moves with them, making contact-points 199 make contact either with contact-points 200 or 201 at either limit of the movement of the inking-frames, thus closing the releasing-circuit through magnet 195, withdrawing the catch 141$^a$, and permitting circuit-controller 141 to open and break the circuit through electric clutch mechanism 18 18$^a$. This disconnects gear-wheel 21 from the shaft of the controlling-engine and immediately stops the movement of the inking-frames. The operation of the said releasing-circuits is thus automatic and needs no supervision on the part of the operator, is simple in its operation and certain in its action, effectually prevents breakage of the parts of the press, while at the same time stopping the printing-cylinders, damping-frames, and inking-frames at a predetermined point with certainty and precision, and releasing the various catches preparatory to the next operation of the controlling-engine. While the operator by closing the releasing-circuits through releasing-magnets 155 and 170 can disconnect the shaft of the controlling-engine from the driving mechanism which is imparting motion to it and can thus at will stop the movements of the different parts of the press, the above automatic means guards against any negligence on the part of the operator and insures the stoppage of each different part of the press being moved exactly at a predetermined point. It is evident of course that in place of the electric circuits employed in this automatic releasing mechanism mechanical means automatically actuated by the different parts of the press to be moved could be substituted in place thereof without departing from my invention. I prefer, however, the arrangement herein shown and described for this purpose.

In order to insure that the different catches will seize and hold their respective circuit-controllers, I preferably insert in the conducting portion 100 of circuit-controllers 94, 96, and 97 a piece of insulation 205. (Shown in black in Figs. 2$^a$, 2$^c$, and 2$^d$.) The insertion of such an insulating-piece within conducting portion 100 causes a second sudden pull to be exerted by each electromagnet on its circuit-controller, thus tending to insure that the catch will seize and hold the circuit-controller. When any of the parts of the press are to be first started and circuit-controller 151, 146, or 141 is closed, the circuit through its corresponding releasing-magnet is of course closed at the same time through contact-points 175 and 176, or 186 and 187, or 199 and 200, thus tending to catch 151$^a$ or 146$^a$ or 141$^a$ from seizing and holding its circuit-controller closed. To overcome this difficulty, I make the conducting-surfaces on the circuit-controlling wheels of sufficient length to insure the starting of the various parts of the press and the consequent separation of the contact-points above referred to before the breaking of the operating-circuits, this insuring the proper operation of the catches. 206 (shown in Fig. 6) is a switch-box for holding circuit-controller 151 and its contact-points and catch and electromagnets 139 and 172. 207, 208, 209, and 210 are similar switch-boxes, holding, respectively, circuit-controllers 119, 164, 146, and 141 and their respective catches, contact-points, electromagnets, and connections. These switch-boxes may be made in any suitable manner, although I prefer the form which is shown and described in my said application for a patent filed herewith and designated as "Case A." As the form of these boxes forms no part of my present invention, I have not shown or described them in detail.

In the form of controlling-engine shown in the drawings the driving mechanism of the controlling-engine consists of the shafts 6 or 6$^a$ 6$^b$ and their connections. The source of power for the controlling-engine is the driving mechanism of the press acting through shaft 10 and its connections. The connecting mechanism between the driving mechanism of the controlling-engine and the damping-frames consists of the train of gearing comprising gears 42 43, shaft 44, and the other gearing connecting said shaft 44 with the damping-frames. The connecting mechanism between the driving mechanism of the controlling-engine and the inking-frames consists of the train of gearing comprising gears 21 22, shaft 23, and the other gearing connecting said shaft 23 with the ink-frames. The connecting mechanism between the driving mechanism of the controlling-engine and the printing-surfaces consists of the train of gearing comprising gear-wheels 65 66, shaft 67, and the other gearing connecting said shaft with the printing-surfaces. The clutch mechanism to connect the source of power, the driving mechanism of the press, with the driving mechanism of the controlling-engine consists of the two clutch gear-wheels 12 and 12 and electric clutches 16 16$^a$ (A) and 16 16$^a$ (B). The clutch mechanism to connect the driving mechanism of the controlling-engine with the connecting mechanism leading to the damping-frames consists of the gear-wheel 42 and electric clutch 38 38$^a$. Similarly the clutch mechanism to connect the driving mechanism of the controlling-engine with the connecting mechanism leading to the inking mechanisms consists of gear-wheel 21 and electric clutch 18 18$^a$, and the clutch mechanism to connect the said driving mechanism with the connecting mechanism leading to the printing-surfaces consists of gear-wheel 65 and electric clutch 64 64$^a$.

In the drawings in this case my controlling-engine has been shown as controlling the movements of the printing, inking, and damping devices only; but it can of course be applied to control the movements of any other part of the press which it may be desired to move.

The driving mechanism of my controlling-engine may be driven from any suitable source of power, although I prefer to drive it, as shown in the drawings, by the driving mechanism of the press.

In the preferred form of my improved device, as shown, the connecting mechanisms intervening between the driving mechanism of the controlling-engine and the different parts of the press are shown as consisting of trains of gearing. Such connecting mechanisms may, however, consist of any other form of mechanism suitable for the purpose. Likewise the means for operating the clutch mechanisms may be varied from those shown in the drawings.

My improved devices are simple in character, compact in form, and are easily operated. By means of them the movements of different parts of the press are easily, automatically, and quickly controlled, and the operator is enabled to move such parts automatically to any desired position with certainty and precision and to time such movements with exactness without any supervision other than is required to turn the hand-wheel to start the operation. Moreover, by my improved means the operator is enabled with great ease to put the automatic controlling mechanism into operation.

This application is designated as "Case C" to distinguish it from two other applications for controlling-engines filed by me simultaneously herewith and designated as "Case A" and "Case B."

What I claim as new, and desire to secure by Letters Patent, is—

1. In a controlling-engine for a press, a shaft, adapted to rotate in either direction, means for rotating it in either direction, driven by the driving mechanism of the press, mechanism connecting with a part of the press to be moved, a gear-wheel arranged and adapted to connect or disconnect the shaft with said connecting mechanism, whereby the shaft, when connected to the connecting mechanism, will drive the latter to move the said part of the press, electric clutch mechanism adapted to cause the gear-wheel to connect the shaft with the said connecting mechanism, or to disconnect them, a circuit through the electric clutch mechanism, a circuit-controller therein, means under the control of the operator for closing the said circuit-controller, to operate the electric clutch mechanism and to move the part of the press, means, operated by the mechanism of the controlling-engine, for automatically opening said circuit-controller to stop the movement of the said part of the press, whereby the operation of the said part of the press will be controlled.

2. In a controlling-engine for a press, a shaft adapted to rotate in either direction, driving mechanism for rotating said shaft, driven by the driving mechanism of the press, two clutch gear-wheels intermediate between said driving mechanism and the shaft, capable of connecting or disconnecting the said driving mechanism with the said shaft, and of driving said shaft in one direction when one gear-wheel connects the driving mechanism of the shaft, and of driving the shaft in the other direction when the other gear-wheel connects them together, electric clutch mechanism adapted to cause one or the other of the said gear-wheels to connect the said driving mechanism with the shaft or to cause both of them to disconnect the driving mechanism from the shaft, a circuit through said clutch mechanism, a circuit-controller therein, means under the control of the operator for closing said circuit-controller, means actuated by the driving mechanism of the controlling-engine for automatically opening said circuit-controller, whereby the said shaft will be rotated in one direction or the other or will remain at rest, connecting mechanisms connecting with different parts of the press to be moved, a gear-wheel and electric clutch mechanism intermediate between the shaft and each of said connecting mechanisms and capable of connecting or disconnecting the shaft with said connecting mechanism, a circuit through each of said electric clutch mechanisms, a circuit-controller in each of said circuits, means under the control of the operator for closing each of said circuit-controllers, and means actuated by the mechanisms of the controlling-engine for automatically opening each of said circuit-controllers, whereby the movements of different parts of the press may be controlled.

3. In a controlling-engine for a press, the combination of electric clutch mechanism for connecting driving parts with a part to be driven or to disconnect them, a circuit through said electric clutch mechanism adapted to cause it to connect the said parts together or to disconnect them, a circuit-controller therein for making or breaking said clutch-circuit, an electromagnet in another circuit arranged and adapted to control the operation of the said circuit-controller in the clutch-circuit, a circuit through said electromagnet, a circuit-controller therein, for making and breaking said operating-circuit, means, under the control of the operator for closing said circuit-controller, and means, automatically actuated by the mechanism of the controlling-engine, for automatically opening the said circuit-controller, whereby the clutch mechanism may be operated to cause it to connect the said driving parts with the said part to be driven and to disconnect them.

4. In a controlling-engine for a press, the combination of electric clutch mechanism for connecting the driving parts with a part to be driven or to disconnect them, a circuit through said electric clutch mechanism adapted to cause it to connect the said parts together or to disconnect them, a circuit-controller therein for making or breaking said clutch-circuit, a catch for seizing and holding said circuit-controller in its operative position, to cause the clutch-circuit to operate the clutch, an electromagnet in another circuit arranged and adapted to control the operation of the circuit-controller in the clutch-circuit, a circuit through said electromagnet, a circuit-controller therein, means under the control of the operator for closing said circuit-controller to operate the clutch mechanism, and means, automatically actuated by the mechanism of the controlling-engine, for releasing the catch to permit the circuit-controller of the clutch-circuit to resume its inoperative position, whereby the clutch mechanism may be operated to cause it to connect the said driving parts with the part to be driven and to disconnect them.

5. In a controlling-engine for a press, the combination of electric clutch mechanism for connecting the driving parts with a part to be driven or to disconnect them, a circuit through said electric clutch mechanism adapted to cause it to connect the said parts together, or to disconnect them, a circuit-controller therein for making or breaking said clutch-circuit, a catch for seizing and holding said circuit-controller in its operative position, to cause the clutch-circuit to operate the clutch, an electromagnet in another circuit arranged and adapted to control the operation of the circuit-controller in the clutch-circuit, a circuit through said electromagnet, a circuit-controller therein, means, under the control of the operator, for closing said circuit-controller to operate the clutch mechanism, an electromagnet in a releasing-circuit arranged and adapted to withdraw the catch to permit the circuit-controller of the clutch-circuit to resume its inoperative position, a circuit through said last-mentioned electromagnet, a circuit-controller therein, means, automatically actuated by the mechanism of the controlling-engine to operate the said circuit-controller to cause the releasing-magnet to release the catch, whereby the clutch mechanism may be operated to cause it to connect the said driving parts with the part to be driven and to disconnect them.

6. In a controlling-engine for a press, the combination of electric clutch mechanism for connecting the driving parts with a part to be driven or to disconnect them, a circuit through said electric clutch mechanism, normally open, adapted to cause it to connect the said parts together or to disconnect them, a circuit-controller therein, normally open, for making or breaking said clutch-circuit, an electromagnet in another circuit arranged and adapted to control the operation of the said circuit-controller in the clutch-circuit, a circuit through said electromagnet, normally open, a circuit-controller therein, normally open, for making and breaking said operating-circuit, means, under the control of the operator for closing said circuit-controller, and means, automatically actuated by the mechanism of the controlling-engine, for automatically opening the said circuit-controller, whereby the clutch mechanism may be operated to cause it to connect the said driving parts with the said part to be driven and to disconnect them.

7. In a controlling-engine for a press, the combination of electric clutch mechanism for connecting the driving parts with a part to be driven or to disconnect them, a circuit through said electric clutch mechanism, normally open, adapted to cause it to connect the said parts together or to disconnect them, a circuit-controller therein, normally open, for making or breaking said clutch-circuit, a catch for seizing and holding said circuit-controller in its closed position, to cause the clutch-circuit to operate the clutch, an electromagnet in another circuit, normally deënergized, arranged and adapted to control the operation of the circuit-controller in the clutch-circuit, a circuit through said electromagnet, normally open, a circuit-controller therein, normally open, means, under the control of the operator, for closing said circuit-controller to operate the clutch mechanism, and means, automatically actuated by the mechanism of the controlling-engine for releasing the catch to open the circuit-controller of the clutch-circuit, whereby the clutch mechanism may be operated to cause it to connect the said driving parts with the part to be driven and to disconnect them.

8. In a controlling-engine for a press, the combination of electric clutch mechanism for connecting the driving parts with a part to be driven or to disconnect them, a circuit through said electric clutch mechanism, normally open, adapted to cause it to connect the said parts together or to disconnect them, a circuit-controller therein, normally open, for making or breaking said clutch-circuit, a catch for seizing and holding said circuit-controller in its closed position, to cause the clutch-circuit to operate the clutch, an electromagnet in another circuit, normally deënergized, arranged and adapted to control the operation of the circuit-controller in the clutch-circuit, a circuit through said electromagnet, normally open, a circuit-controller therein, normally open, means, under the control of the operator, for closing said circuit-controller to operate the clutch mechanism, an electromagnet, normally deënergized, in a releasing-circuit arranged and adapted to withdraw the catch to permit the circuit-controller of the clutch-circuit to open, a circuit through said last-mentioned electromagnet, normally open, a circuit-controller therein, normally open, means automatically actuated by the mechanism of the controlling-engine to operate the said circuit-controller to cause the releasing-magnet to release the catch, whereby the clutch mechanism may be operated to cause it to connect the said driving parts with the part to be driven and to disconnect them.

9. The combination in a press, of a part of the press to be moved, driving mechanism for moving said part of the press, connecting mechanism between the driving mechanism and the part of the press to be moved, adapted to connect or disconnect the said driving mechanism to the said part of the press whereby, when the driving mechanism and the said part of the press are thus connected, motion will be imparted from the driving mechanism to the said part of the press to move the latter, electric clutch mechanism arranged and adapted to cause the said connecting mechanism to connect the driving mechanism with the said part of the press and to disconnect them, a circuit through the electric clutch mechanism, and a circuit-controller therein for making and breaking said circuit and thereby operating the clutch mechanism, and means for automatically operating the circuit-controller and breaking the circuit whereby the clutch mechanism will be automatically operated, whereby the operation of the said part of the press may be controlled.

10. In a controlling-engine for a press, the combination with different parts of the press to be moved, of a shaft adapted to be rotated in either direction, means, operated by the driving mechanism of the press, for rotating said shaft in either direction, connecting mechanisms between the shaft and the different parts of the press to be moved, a gear-wheel and electric clutch intermediate between the shaft and each connecting mechanism, adapted, when the gear-wheel connects the shaft with the connecting mechanism, to drive the latter and move the press one way or the other as the shaft is rotated one way or the other, and, when the gear-wheel disconnects the shaft and the connecting mechanism, to permit the connecting mechanism and the said part of the press to remain at rest, a series of clutch-circuits, one for each clutch, each having a circuit-controller therein, a series of operating-circuits, one for each clutch-circuit, each operating-circuit having an electromagnet controlling the circuit-controller of its clutch-circuit, and also having a circuit-controller adapted to be operated by the operator to cause said clutch to connect the shaft with the said connecting mechanism, means automatically actuated by the mechanism of the controlling-engine for opening the said circuit-controller, a catch for the circuit-controller of each clutch-circuit to hold the said circuit-controller in its closed position, a series of releasing-circuits, one for each catch, each releasing-circuit containing an electromagnet adapted, when energized, to withdraw the catch to permit the circuit-controller of the clutch-circuit to open, and also containing a circuit-controller, automatically closed, to energize said electromagnet and withdraw the catch, by the corresponding part of the press when it reaches the limit of its movement.

11. In a controlling-engine for a press, the combination of electric clutch mechanism for connecting the driving parts with a part to be driven or to disconnect them, a circuit through said electric clutch mechanism adapted to cause it to connect the said parts together, or to disconnect them, a circuit-controller therein for making or breaking said clutch-circuit, a catch for seizing and holding said circuit-controller in its operative position, to cause the clutch-circuit to operate the clutch, an electromagnet in another circuit arranged and adapted to control the operation of the circuit-controller in the clutch-circuit, a circuit through said electromagnet, a circuit-controller therein, means, under the control of the operator, for closing said circuit-controller to operate the clutch mechanism, an electromagnet in a releasing-circuit arranged and adapted to withdraw the catch to permit the circuit-controller of the clutch-circuit to resume its inoperative position, a circuit through said last-mentioned electromagnet, a circuit-controller therein, means, automatically operated by the mechanism of the controlling-engine to operate the said circuit-controller to cause the releasing-magnet to release the catch, whereby the clutch mechanism may be operated to cause it to connect the said driving parts with the part to be driven or to disconnect them.

In testimony whereof I have signed my name to this specification in the presence of two subscribing witnesses.

EDWARD HETT.

Witnesses:
 EDWIN SEGER,
 SIDNEY MANN.